(12) United States Patent
Fowe

(10) Patent No.: US 11,382,148 B2
(45) Date of Patent: Jul. 5, 2022

(54) LANE AWARE CLUSTERS FOR VEHICLE TO VEHICLE COMMUNICATION

(71) Applicant: HERE Global B.V., Eindhoven (NL)

(72) Inventor: James Fowe, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 17/121,341

(22) Filed: Dec. 14, 2020

(65) Prior Publication Data

US 2021/0127433 A1  Apr. 29, 2021

Related U.S. Application Data

(62) Division of application No. 16/392,855, filed on Apr. 24, 2019, now Pat. No. 10,887,928.

(51) Int. Cl.
| | |
|---|---|
| *H04W 76/10* | (2018.01) |
| *H04W 4/02* | (2018.01) |
| *H04W 4/46* | (2018.01) |
| *H04W 84/18* | (2009.01) |
| *G08G 1/01* | (2006.01) |
| *H04B 7/26* | (2006.01) |

(52) U.S. Cl.
CPC .......... *H04W 76/10* (2018.02); *G08G 1/0112* (2013.01); *H04B 7/26* (2013.01); *H04W 4/027* (2013.01); *H04W 4/46* (2018.02); *H04W 84/18* (2013.01)

(58) Field of Classification Search
CPC ....... H04W 76/10; H04W 4/46; H04W 4/027; H04W 84/18; H04B 7/26; G08G 1/0112
See application file for complete search history.

(56) References Cited

U.S. PATENT DOCUMENTS

| | | | |
|---|---|---|---|
| 6,349,091 B1* | 2/2002 | Li | H04L 45/02 370/238 |
| 9,643,615 B2 | 5/2017 | Kline | |
| 10,168,418 B1 | 1/2019 | Al-stouhi | |
| 2006/0125616 A1 | 6/2006 | Song | |
| 2007/0008927 A1* | 1/2007 | Herz | H04L 45/30 370/331 |
| 2007/0027610 A1* | 2/2007 | Parikh | G08G 1/20 701/117 |

(Continued)

FOREIGN PATENT DOCUMENTS

| | | |
|---|---|---|
| CN | 102325306 B | 1/2014 |
| CN | 105245563 A | 1/2016 |

OTHER PUBLICATIONS

European Search Report for European Patent Application No. 20170825.2-1213 dated Sep. 22, 2020.

(Continued)

*Primary Examiner* — Dominic E Rego
(74) *Attorney, Agent, or Firm* — Lempia Summerfield Katz LLC

(57) ABSTRACT

System and methods are provided for generating lane aware clusters for vehicle to vehicle communications. A vehicle uses lane level map matching to obtain a current travelling lane. Vehicles that are within a proximity radius exchange data such as location, lane, speed, direction. Sub clusters are creating with vehicles driving on the same lane based on proximity distance. The sub clusters are merged into one cluster based on sub cluster similarity in terms of spatial proximity, average speed, and direction.

19 Claims, 10 Drawing Sheets

(56) References Cited

U.S. PATENT DOCUMENTS

| | | | |
|---|---|---|---|
| 2008/0136612 A1 | 6/2008 | Machii | |
| 2008/0238720 A1* | 10/2008 | Lee | G08G 1/081 |
| | | | 340/909 |
| 2008/0263073 A1* | 10/2008 | Ohba | G06F 11/3419 |
| 2008/0268855 A1* | 10/2008 | Hanuni | H04L 41/0896 |
| | | | 455/445 |
| 2010/0332127 A1 | 12/2010 | Imai | |
| 2012/0120883 A1* | 5/2012 | Chen | H04W 74/08 |
| | | | 370/329 |
| 2013/0242284 A1* | 9/2013 | Zeng | G01S 17/66 |
| | | | 356/4.01 |
| 2013/0282264 A1* | 10/2013 | Bastiaensen | G08G 1/0129 |
| | | | 701/119 |
| 2014/0019039 A1 | 1/2014 | Chowanic | |
| 2015/0198711 A1* | 7/2015 | Zeng | G01S 13/726 |
| | | | 342/59 |
| 2015/0245397 A1* | 8/2015 | Sachs | H04W 76/14 |
| | | | 455/426.1 |
| 2016/0059733 A1* | 3/2016 | Hettrich | H04W 4/029 |
| | | | 701/2 |
| 2016/0212596 A1* | 7/2016 | Brahmi | H04W 72/042 |
| 2016/0381694 A1* | 12/2016 | Yano | H04W 8/005 |
| | | | 370/329 |
| 2017/0032402 A1* | 2/2017 | Patsiokas | G06Q 30/0261 |
| 2017/0089717 A1 | 3/2017 | White | |
| 2017/0096042 A1 | 4/2017 | Unger | |
| 2017/0109653 A1 | 4/2017 | Agarwal | |
| 2017/0215123 A1* | 7/2017 | Miranda D'Orey | H04W 40/12 |
| 2017/0316684 A1* | 11/2017 | Jammoussi | G08G 1/096775 |
| 2017/0322314 A1* | 11/2017 | Yang | G01S 5/0072 |
| 2018/0189601 A1 | 7/2018 | Dabeer | |
| 2018/0240335 A1 | 8/2018 | Dong | |
| 2018/0242392 A1 | 8/2018 | Liu | |
| 2019/0007484 A1 | 1/2019 | Chen | |
| 2019/0025837 A1* | 1/2019 | Conor | G05D 1/0278 |
| 2019/0095722 A1 | 3/2019 | Kang | |
| 2019/0132709 A1 | 5/2019 | Graefe | |
| 2019/0205806 A1* | 7/2019 | Karmakar | G06Q 30/02 |
| 2019/0228649 A1* | 7/2019 | Xu | G06F 16/254 |
| 2019/0251848 A1* | 8/2019 | Sivanesan | H04L 5/0048 |
| 2019/0327588 A1 | 10/2019 | Gong | |
| 2019/0383626 A1 | 12/2019 | Fowe | |
| 2020/0003861 A1 | 1/2020 | Eriksson | |
| 2020/0019815 A1 | 1/2020 | Balu | |
| 2020/0120458 A1* | 4/2020 | Aldana | H04W 72/048 |
| 2020/0180634 A1* | 6/2020 | Hammoud | B60W 30/09 |
| 2020/0294394 A1* | 9/2020 | Guo | G08G 1/22 |
| 2020/0320339 A1* | 10/2020 | Rawashdeh | G01S 17/42 |

OTHER PUBLICATIONS

Farooq, Waqar, Muazzam Ali Khan, and Saad Rehman. "A Novel Real Time Framework for Cluster Based Multicast Communication in Vehicular Ad Hoc Networks." International Journal of Distributed Sensor Networks 12.4:8064908. Apr. 19, 2016. (pp. 1-18).

Mohammad, S. Almalag, and C. Weigle Michele. "Using Traffic Flow for Cluster Formation in Vehicular Ad-Hoc Networks." IEEE Local Computer Network Conference IEEE, Oct. 2010 (pp. 631-636).

Yang, Fan, Zhijian Lin, and Yuliang Tang. "A Traffic Flow Based Clustering Scheme for VANETs." Sensors & Transducers 180.10. Oct. 31, 2014. (pp. 110-116).

* cited by examiner

LANE AWARE CLUSTERS FOR VEHICLE TO VEHICLE COMMUNICATION

CROSS REFERENCE TO RELATED APPLICATIONS

This application is a divisional under 37 C.F.R. § 1.53(b) of U.S. patent application Ser. No. 16/392,855 filed Apr. 24, 2019 now U.S. Pat. No. 10,887,928 which is hereby incorporated by reference in its entirety.

FIELD

The following disclosure relates to navigation devices or services.

BACKGROUND

For mapping applications, multiple different systems may be used to provide required services. The combination of vehicle sensors, an HD map, and vehicle to vehicle communications provide for safe and efficient navigation of the roadway.

Sensors in vehicles may be able to detect lanes and lane markings in real time using image processing and light detection and ranging (LIDAR) based systems. The sensor systems are useful for obstacle avoidance and detecting the movements of other vehicles. When used alone though, on-board sensor systems may exhibit large blind spots and may be unable to predict events or maneuvers even a short distance away. Vehicle sensors, however, when combined with HD maps may provide for a vehicle to precisely position itself laterally and longitudinally, and also for the car to maneuver correctly. While sensors in vehicles may detect at a radius of approximately one hundred meters, a car traveling at eighty miles per hour may only have a sensing horizon of three seconds. Vehicles may need highly accurate and up to date maps to extend sensor range and "peek" around the corner.

HD maps allow a vehicle to identify precisely where it is with respect to the road (or the world) far beyond what the Global Positioning System (GPS) can do, and without inherent GPS errors. The HD map allows the vehicle to plan precisely where the vehicle may go, and to accurately execute the plan because the vehicle is following the map. By identifying precisely where a vehicle is on the road to the decimeter or even centimeter, and understanding the surroundings, a mapping platform may bring advanced safety to an ever-changing environment.

An HD map, however, may only be useful if it is updated and accurate. Sensing road hazards as the hazards approach is imperative, however, vehicles may not be able to rely on last minute decisions based on what the vehicle itself can detect. Fully autonomous and semi-autonomous vehicles need the ability to see beyond the range of their own sensors. This comes to fruition when a car is reporting its sensor data. Other nearby cars then receive that information, learn from it, and share that information back in near-real time. In this way, the more cars that are sensing the conditions of the road, the safer the road becomes. Knowing about slick weather conditions, potholes, and traffic patterns enables the vehicle to decide where and how to drive in the safest way possible.

Vehicle-to-vehicle (V2V) communication enables vehicles to wirelessly exchange information about their speed, location, heading, and roadway conditions. V2V communication allows vehicles to broadcast and receive omni-directional messages creating a 360-degree "awareness" of other vehicles in proximity of the vehicle. Vehicles equipped with appropriate software may use the messages from surrounding vehicles to determine potential threats or obstacles as the threats develop. The technology may then employ visual, tactile, and audible alerts, or, a combination of the alerts, to warn drivers. The alerts allow drivers the ability to take action to avoid crashes.

Vehicles that could use V2V communication technology range from cars and trucks to buses and motorcycles. Even bicycles and pedestrians may leverage V2V communication technology to enhance their visibility to motorists. V2V communication technology may increase the performance of vehicle safety systems and help save lives. Connected vehicle technologies provide drivers with the tools the drivers and vehicles need to anticipate potential crashes and significantly reduce the number of lives lost each. While there are basic ad-hoc wireless communication systems for V2V, it is hard to establish a communication protocol that is robust to the dynamics of moving vehicles on the road. One of the most popular V2V communication system is referred to as a Vehicular ad-hoc Network (VANET).

There are various data exchange and communication protocol proposed for VANETs. One of the most prevalent ones are cluster-based approaches where closer neighbor vehicles form a cluster and selects a cluster head to handle communication with other clusters. However, the VANET clusters are not lane-aware in that the clusters assume all vehicles on a link or road segment include uniform speed or momentum. Others assume lane-awareness but expects the vehicle to have advanced sensors for lane detection, which does not scale to many vehicles.

SUMMARY

In an embodiment, a method is provided for forming clusters for vehicle to vehicle communication. Sensor data is acquired from one or more sensors embedded in a vehicle, the sensor data including a location, average speed, direction, and momentum of the vehicle. The location is map matched to a lane using the sensor data. The sensor data is exchanged with other vehicles within a proximity radius. A sub cluster is generated with vehicles driving on the same lane based on a proximity vehicle distance. The sub cluster is merged with other sub clusters into a cluster of vehicles based on spatial proximity, average velocity, and momentum of the sub clusters. Vehicle to vehicle communication is established between vehicles in the cluster of vehicles.

In an embodiment, an apparatus is provided for forming clusters for vehicle to vehicle communication. The apparatus includes one or more sensors configured to acquire data about a vehicle, a transmitter configured to transmit and receive data to and from other vehicles on a roadway, and a processor configured to identify a lane that the vehicle is traversing, generate a sub cluster of vehicles traveling on the lane within a proximity distance, merge the sub cluster with other sub clusters based on spatial proximity, average velocity, and momentum of the sub clusters, and establish communication using the transmitter with the other vehicles in the cluster of vehicles.

In an embodiment, an intelligent transportation system is provided that includes a first plurality of vehicles, a second plurality of vehicles, and a vehicular ad hoc network. The first plurality of vehicles traverse a first lane on a roadway. The second plurality of vehicles traverse a second lane on the roadway. The vehicular ad hoc network is configured to provide communications between a cluster head and vehicles in the first plurality of vehicles and second plurality of vehicles; wherein the vehicular ad hoc network is formed by generation of a first sub cluster of the first plurality of vehicles and a second sub cluster of the second plurality of vehicles and a combination of the first sub cluster and second sub cluster based on a spatial proximity, an average velocity, and a momentum of the first sub cluster and second sub cluster.

BRIEF DESCRIPTION OF THE DRAWINGS

Exemplary embodiments of the present invention are described herein with reference to the following drawings.

DETAILED DESCRIPTION

Embodiments described herein provide systems and methods for generating lane aware VANET clusters for V2V communications. A vehicle uses lane level map matching to obtain a current travelling lane. Vehicles that are within a proximity radius exchange data such as location, lane, speed, direction. VANET sub clusters are creating with vehicles driving on the same lane based on proximity distance. The sub clusters are merged into one VANET cluster based on sub cluster similarity in terms of spatial proximity, average speed, and direction.

A wireless ad hoc network (WANET) or mobile ad hoc network (MANET) is a decentralized type of wireless network. The network is ad hoc because the network does not rely on a pre-existing infrastructure, such as routers in wired networks or access points in managed (infrastructure) wireless networks. Instead, each device participates in routing by forwarding data for other devices, so the determination of which device forward data is made dynamically on the basis of network connectivity and the routing algorithm in use. Wireless mobile ad hoc networks are self-configuring, dynamic networks in which the devices are free to move. Wireless networks lack the complexities of infrastructure setup and administration, enabling devices to create and join networks "on the fly"—anywhere, anytime.

A VANET is a type of wireless ad hoc network that provides communication between vehicles. A VANET may be part of a communication system that includes both V2V and Vehicle-to-Infrastructure (V2I) communications. Vehicles communicate with other vehicles forming multiple VANETs that provide wireless communication in a distributed manner while vehicles may communicate with roadside units in an infrastructure mode.

Figure 1:
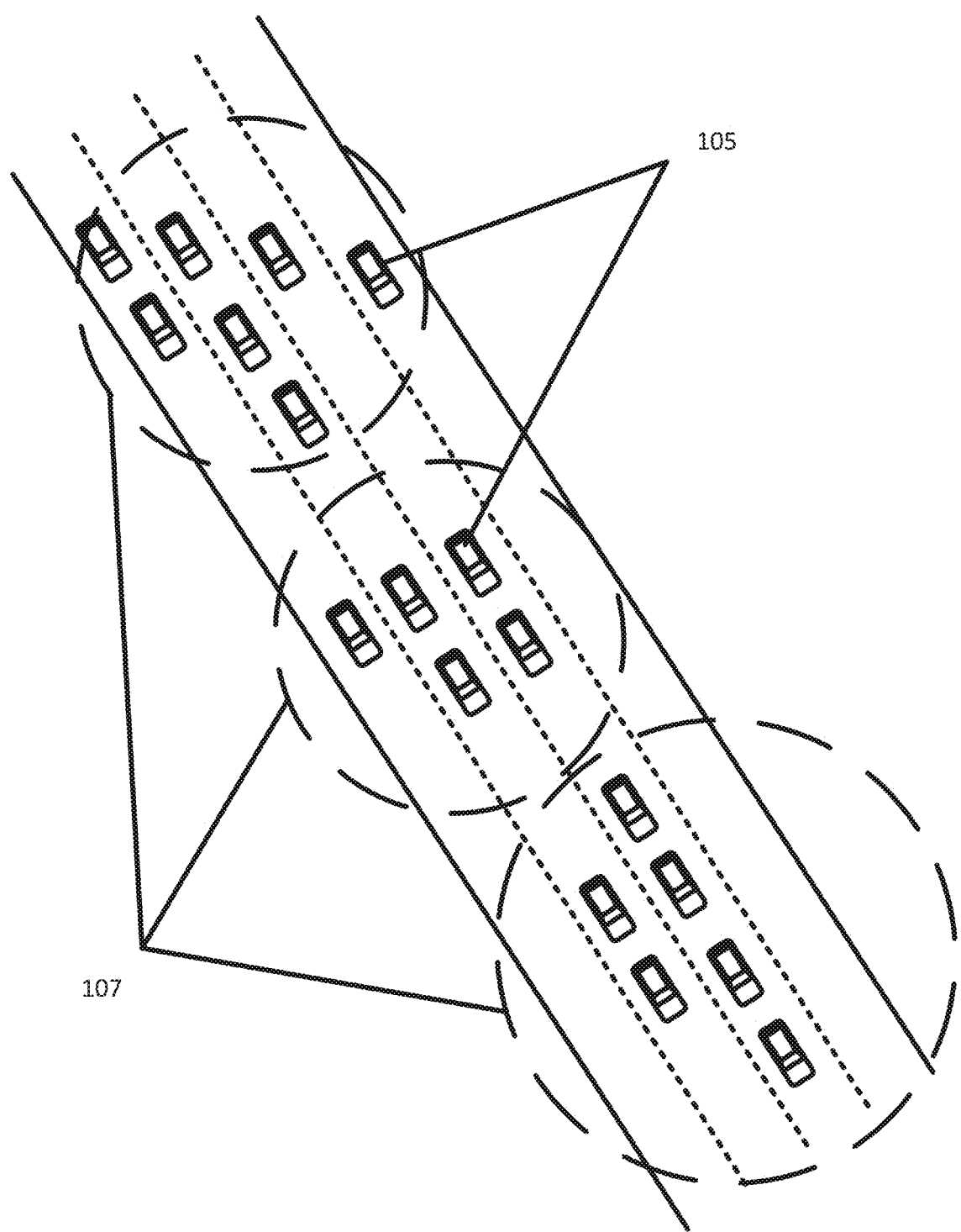
FIG. 1 depicts an example of a communication system that includes multiple VANETs.

FIG. 1 depicts an example of a communication system that includes multiple VANETs. FIG. 1 depicts a roadway network with four lanes and eighteen vehicles 105. In order to reduce the network traffic and routing overheads in VANET, a cluster-based routing strategy may be used. Cluster based routing uses a network architecture based on small groups of vehicles referred to as clusters. As depicted in FIG. 1, there are three distinct clusters 107 that are created using a proximity-based algorithm. The size and makeup of the cluster depends on the design of the routing algorithm. The routing algorithm may be based on different attributes of the vehicles such as the number of vehicles in a cluster or the geographical position of the vehicles. The routing algorithm is important in that a good routing algorithm provides consistent and useful clusters so that communications between the vehicles is optimized both in efficiency and effectiveness in sharing information. One issue with many routing algorithms is that the algorithms do not take into account the multi-modality nature of road traffic. For example, mere proximity of vehicles on a road segment is not enough to form a cluster. Even taking into account other factors such as speed, current routing algorithms fail to provide optimal cluster.

Figure 2:
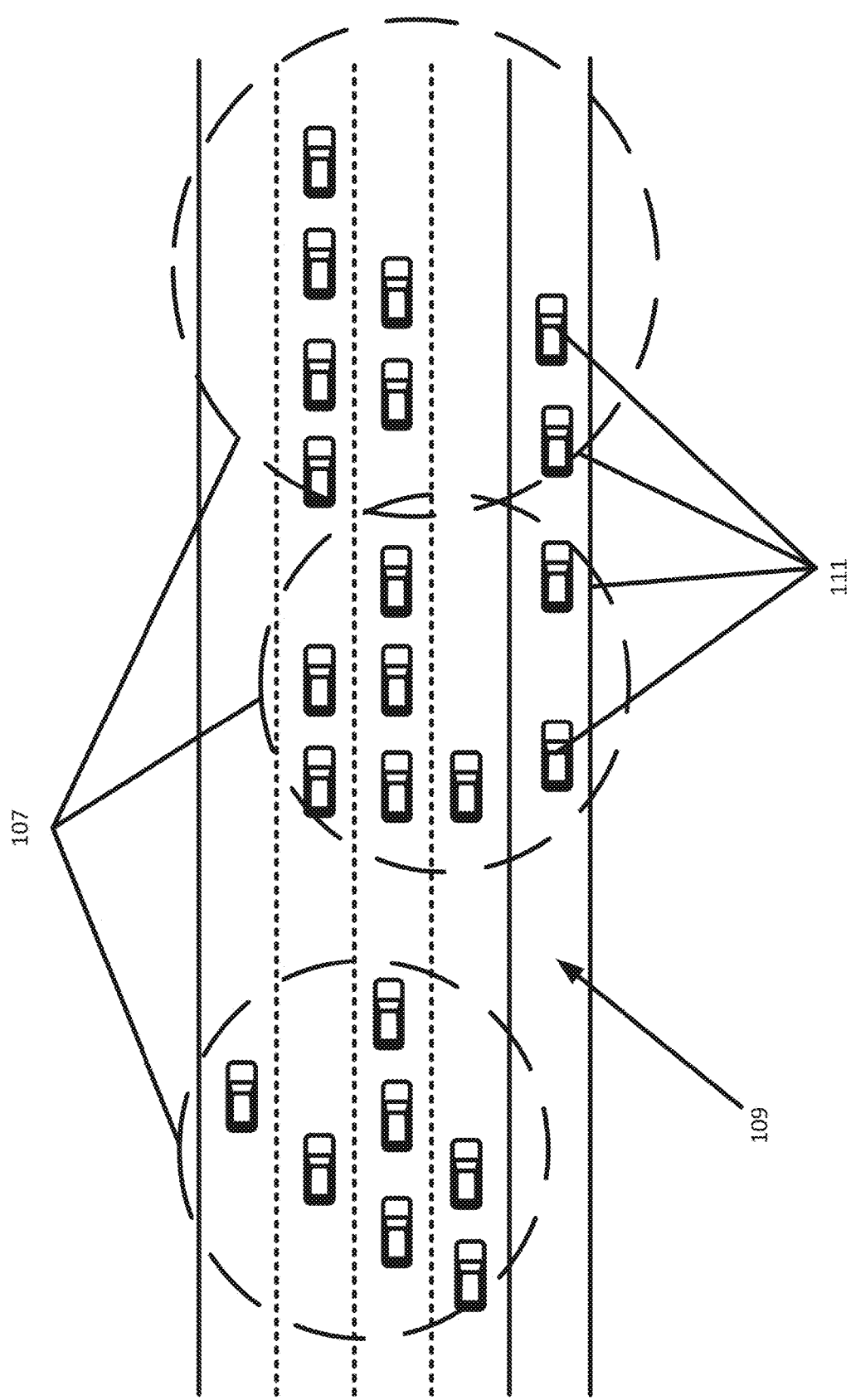
FIG. 2 depicts an example of multiple VANETs on a roadway including a high occupancy lane.

As an example, vehicles movements (speed and momentum) may be related (if not causative) to the individual lanes as sometimes there is lane-level divergence in vehicle speeds. This is well known in traffic processing system, for example in roads with HOV as depicted in FIG. 2. FIG. 2 depicts an example of a scenario with lane aware VANET clusters for vehicle to vehicle communication. In FIG. 2, the average speed of the vehicles on each lane is different and the vehicles 111 on an HOV lane 109 are driving at a significantly faster speed. The vehicles on the HOV lanes 109 should be on the same VANET cluster and other lanes on a different VANET clusters since their speeds are more similar and each cluster would be more likely to experience the same threats/obstacles. However, due to the proximity algorithm, there are three VANETs 107. These VANETS 107 may form quickly and then dissipate. Further, the vehicles in the VANETS 107 may not be supported as the vehicles experience different roadway conditions that other vehicles in the VANETS 107.

Embodiments described herein provide cluster-based routing techniques that take advantage of precise lane-level differentiation and vehicle parameters to provide longer lasting and consistent VANET clusters. Creating VANET clusters this way provides better V2V communication, accuracy and faster reactions for navigation applications and vehicles on the roadway. For example, in FIG. 2, a separate VANET cluster may be formed on the HOV lane. This cluster moves faster and will keep the vehicles on the HOV lanes coordinated and connected, while a VANET cluster on the other lanes would keep the vehicles in the respective group coordinated and connected.

Embodiments provide a two-dimensional VANET clusters protocol where one dimension represents a cross-sectional cluster of vehicles across the lanes, while the other dimension represents lateral cluster along the lanes. In an embodiment, a cluster head (CH) for each dimension will allow for a more robust VANET. Embodiments provide stable and reliable VANET clusters with the goal of enabling lane-level differentiation so as to provide functionality and communications in V2V and navigation applications.

Figure 3:
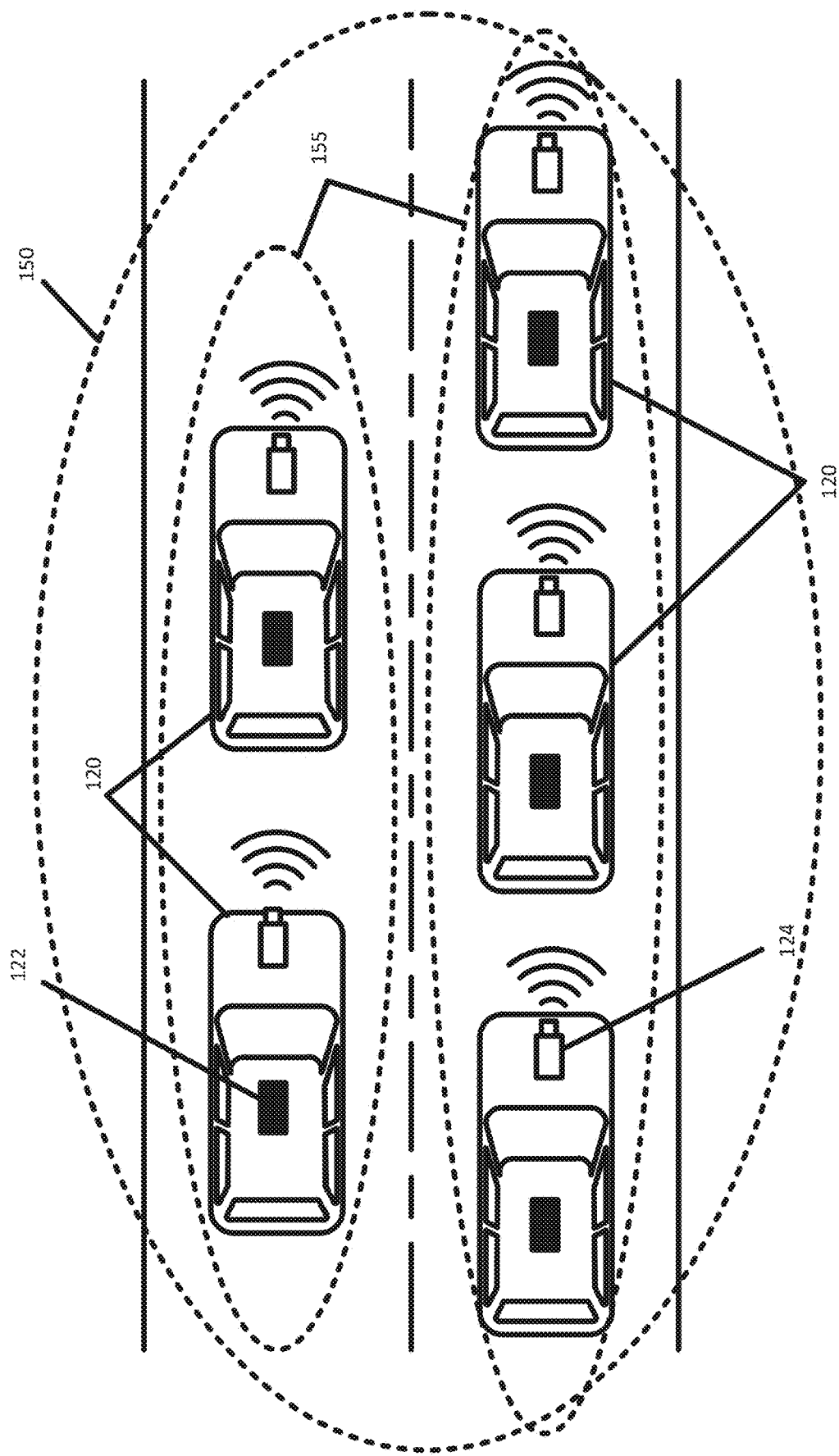
FIG. 3 depicts a VANET according to an embodiment.

FIG. 3 depicts a system for providing lane aware VANET clusters for V2V communication. FIG. 3 includes five vehicles 120 that are traversing a roadway network. The vehicles 120 may include or embed a device 122 such as a navigation device. The devices 122 may include probe devices, probe sensors, or other devices 122 such as personal navigation devices 122 or connected vehicles. The device 122 may be a navigation system built into the vehicle and configured to monitor the vehicle. The devices 122 may also be integrated in or with a vehicle 120. The devices 122 may include mobile phones running specialized applications that collect location data as the devices 122 are carried by persons or things traveling the roadway network. The devices 122 may be configured to collect and transmit data including the location of a vehicle 120 and the condition of a roadway network. The devices 122 may be configured to provide guidance for a user or vehicle 120.

The vehicles 120 may include one or more sensors 124 configured to acquired information relating to the location of the device 122 and roadway conditions in the vicinity of the device 122. The sensors 124 may include sensors such as GPS, LiDAR, radio detection and ranging (Radar), video capture devices, or other sensors. Sensors 124 may be embedded in a vehicle and may, for example, measure or collect information relating to the operation of the vehicle such as direction, speed, acceleration, etc.

The device 122 may be configured to provide lane level positioning of the vehicle. Lane level positioning may be provided using one or more sensor systems 124. Lane level positioning, for example, may be provided using a series of GPS points acquired by the device 122. Lane level positioning may be provided using LiDAR, RADAR, video, images, or other sensors on a vehicle. For example, the device 122 may determine a current lane position based on image recognition techniques and a stored HD map.

The vehicles 120 may receive or transmit data through a network. The network may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, DSRC (otherwise known as WAVE, ITS-G5, or 802.11p and future generations thereof), a 5G wireless network, or wireless short-range network. Further, the network may be a public network, such as the Internet, a private network, such as an intranet, or combinations thereof, and may utilize a variety of networking protocols now available or later developed including, but not limited to transmission control protocol/internet protocol (TCP/IP) based networking protocols.

The network may include one or more VANETs. A VANET, is a vehicle ad hoc network. Vehicular communication in VANETs is performed by exchanging information using Vehicle-to-Vehicle (V2V) and Vehicle-to-Infrastructure (V2I) communications. The network is ad hoc because the network does not rely on a pre-existing infrastructure, such as routers in wired networks or access points in managed (infrastructure) wireless networks. Instead, each device 122/vehicle 120 participates in routing by forwarding data for other devices 122/vehicles 120, so the determination of which devices forward data is made dynamically on the basis of network connectivity and the routing algorithm in use. The term vehicle 120 may be used herein to include the functionality of the device 122. For example, in a V2V system, the communication may be between two devices 122 that are embedded or otherwise connected with two vehicles 120. To maintain simplicity, when a vehicle 120 is communicating with another vehicles 120, it may be assumed that the device 122 in one vehicle is communicating with another device 122 in the other vehicle. Vehicles 120 may communicate with other vehicles through devices 122 or On-Board Units (OBUs) forming Mobile Ad Hoc Networks (MANETs) that allow wireless communication in a completely distributed manner while the vehicles communicate with roadside units in an infrastructure mode.

FIG. 3 depicts a single VANET 150 representing a cluster that includes two sub clusters 155 of vehicles on a respective lane. The devices 122 within vehicles may use the VANET to spontaneously and dynamically transmit and receive messages from other vehicles without the aid of infrastructure devices. The devices 122 may identify the behavior of other vehicles or the conditions of the roadway by communicating using a VANET.

The VANET may use a clustering algorithm to determine which devices 122 are to be grouped together in order to communicate reliably. Since the network is ad hoc, there is no set grouping of devices 122 in each network, rather the number and identity of the devices 122 in each network changes over time. A clustering algorithm determines which devices 122 should be in which clusters as a function of one or more variables as described below. When a vehicle initially joins the road network and decides that it is willing to participate in a VANET, the device 122 initiates a communication protocol. The device 122 is considered to have entered a network, initially with only itself as a member. The device 122 starts by announcing its existence to its neighbors through a periodic broadcast, while simultaneously gathering similar information from its neighbors, either passively by listening for broadcasts, or actively through neighbor solicitation requests. The information includes position information for the neighboring device 122 and the lanes on which the neighboring devices 122 are operating on, and is stored in a neighbor table on the device 122 for use by the clustering algorithm.

In an embodiment, each device 122, when it wishes to join a network, transmits a HELLO message; at the same time, it also forwards the HELLO messages of other vehicles. The HELLO message may be sent to all other devices 122 within a predefined proximity. The predefined proximity may be based on physical distance. The HELLO message may include attributes of the originating device 122. For example, a device 122 may generate and transmit a HELLO message that includes a GPS location, current speed, acceleration, direction, lane identifier, and other information related to the device 122. The device information may be calculated from data acquired by the device 122 from the one or more sensors attached or connected to the vehicle. After receiving respective HELLO messages back from nearby devices 122, the device 122 will be capable of processing all other vehicles' information, which includes an ID number, GPS location, current speed, acceleration, direction, lane identifier, and other information related to the device 122. Every device 122 upon receiving the HELLO message from others stores the other device's information and subsequently uses this information to determine the proximity of each device 122 and save it for further usage. During the information collection process, the receiving device 122 stores the information and forwards the information to the next device 122. After a number of transmissions, the devices 122 will have all the neighbors' information.

A VANET sub cluster is created of vehicles driving on the same lane based on proximity vehicle distance. The proximity vehicle distance may be set based on the speed, lane type, transmission range, or other variable. The proximity vehicle distance may be calculated from a cluster head vehicle or may be, for example, based on the distance or variance between two of the furthest separated vehicles in the sub cluster. Each VANET sub cluster may be controlled by a cluster head. The Cluster head is responsible for passing packets and organizing inter-/intra-cluster information traffic. Most of the clustering routing protocols normally elect the cluster head based on the location or velocity. A selection using location is not usually an optimum choice, because the location of the selected vehicle may rapidly change according to the relative speed with the other vehicles in the network. The vehicle with the best location may quickly become unsuitable as the cluster head. On the other hand, selecting the cluster head according to the velocity is also not appropriate in many situations, particularly when the relative movement between vehicles is very high. This will consequently lead to cluster instability. Moreover, the speed of the vehicles directly affects their locations. The cluster head selection method may include many factors to obtain high cluster stability and network reliability. The cluster head may be selected by considering the location, velocity, and the equipment of the vehicles in order to obtain a high cluster stability and for optimum utilization of available equipment in the network.

In an embodiment, an approach for cluster head selection requires each vehicle to calculate an index quantifying its ability to act as a cluster head for its neighbors in the sub cluster, and to advertise this index within the sub cluster. Vehicles that want to affiliate with a cluster head will then rank all neighbors in their neighbor table and request association with the most highly-ranked candidate node, which may be the node itself. The index may be weighted sum of various network metrics, such as the degree of connectivity, link stability, node uptime etc., with the weights reflecting the relative importance of the selected metrics for this network.

The devices 122 are configured communicate with one another to merge the sub clusters into a cluster of devices 122. The cluster head may identify attributes of the sub cluster. For example, the cluster head may determine an average speed of vehicles in the sub cluster or momentum or direction of the vehicles. Other attributes collected from the vehicles may also be used to identify attributes of the cluster as a whole. The cluster head communicates the attributes to other nearby cluster heads to merge the sub clusters to form one VANET cluster based on similarity in sub clusters in terms of spatial proximity, similarity in average speed or momentum (mass*velocity) and similarity in direction. A new cluster head may be selected for the merged VANET cluster. The new cluster and the sub clusters may be reformed, may admit or reject new devices 122 to the cluster, or perform new cluster head elections as needed as vehicles drop out of range or alter their parameters. The sub clusters may change more rapidly than the cluster due to lane changes. The new cluster head establishes communication between various cluster head on a road segment. This communication may either be via V2V or V2I2V or V2C. The new cluster head may communicate with other cluster heads, roadside beacons, or other devices 122.

Figure 4:
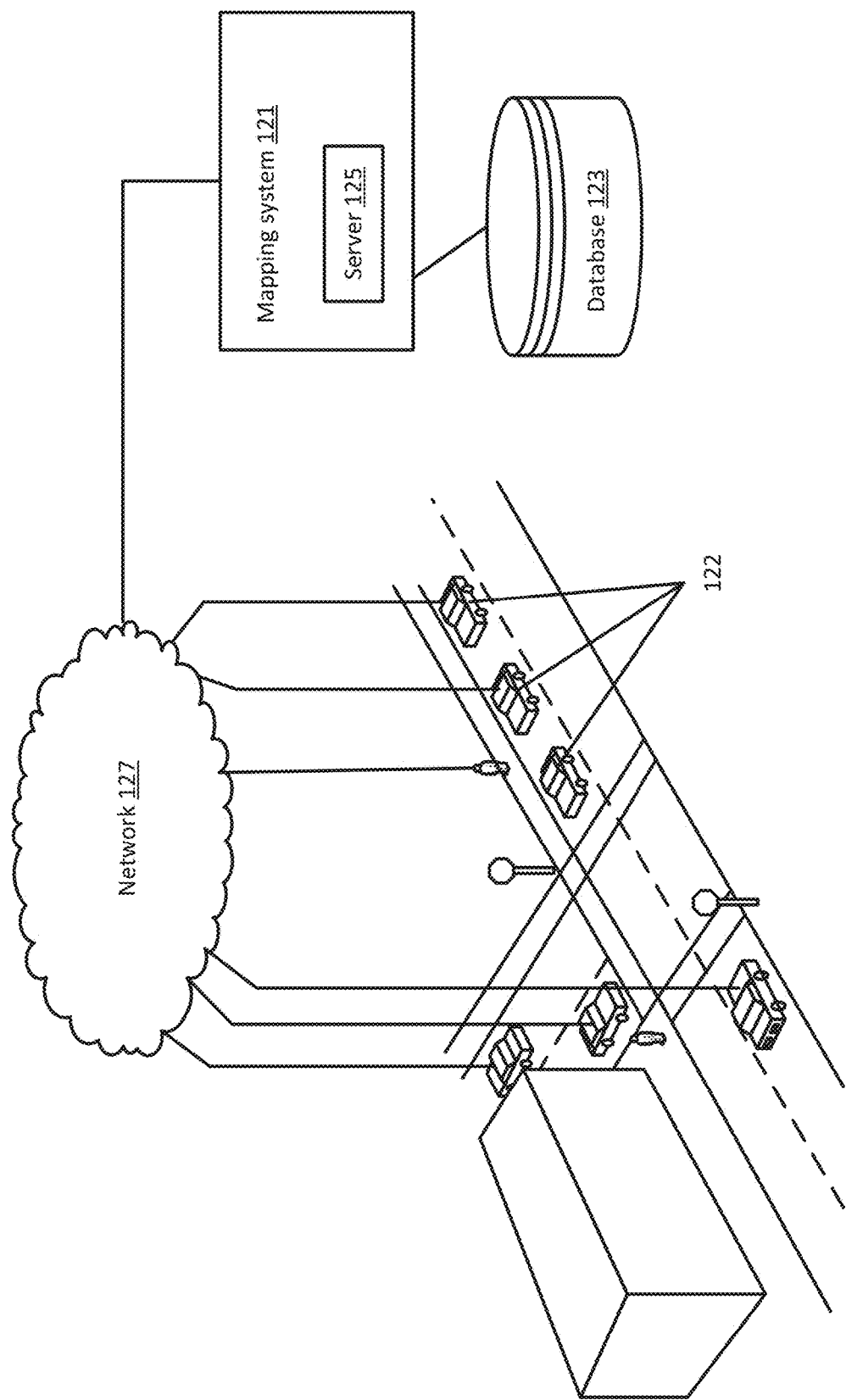
FIG. 4 depicts an intelligent transportation system according to an embodiment.

FIG. 4 depicts a system including V2V communications. The system includes one or more devices 122, a network 127, and a mapping system 121. The mapping system 121 may include or may be connected to a database 123 (also referred to as a geographic database or map database). The mapping system 121 may include one or more servers 125. Additional, different, or fewer components may be included.

FIG. 4 may include roadside communication units or roadside equipment. Roadside communication units represent devices 122 that are used to send messages to, and receive messages from, nearby vehicles using Short Range Communications (e.g., DSRC) or other alternative wireless communications technologies. Communications with other roadside communication units and the mapping system over the network are also supported. Roadside communications units may function from a fixed position and may be permanently deployed or a portable device that is located temporarily in the vicinity of a traffic incident, road construction, or a special event. The roadside communications units may include a processor, data storage, and communications equipment that is configured to communication with passing vehicles, other field equipment, devices 122, and the mapping system. Roadside equipment may also be used to refer more generically to ITS field equipment including signal controllers, In V2V communication, the messages are broadcast from vehicle to vehicle across multiple hops without the involvement of a roadside unit. However, communications may first be sent to a roadside unit, from for example, a mapping system, and then broadcast by the roadside unit to all vehicles or devices 122 in range. The device 122 may be integrated into an autonomous vehicle or a highly-assisted or highly-automated driving (HAD) vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. The autonomous vehicles may park themselves or move cargo between locations without a human operator. Autonomous vehicles may include multiple modes and transition between the modes. The autonomous vehicle may steer, brake, or accelerate the vehicle based on the position of the vehicle in order to avoid or comply with a routing or driving instruction from the device 122 or a remote mapping system.

The device 122 may be configured as a navigation system for an autonomous vehicle or a HAD. Any of these assisted driving systems may be incorporated into the device 122. Alternatively, an assisted driving device may be included in the vehicle. The assisted driving device may include memory, a processor, and systems to communicate with the mobile device 122. The assisted driving vehicles may response to geographic data received from geographic database 123 and the server 125. An autonomous vehicle or HAD may take route instructions based on a road segment and node information provided to the navigation device 122. An autonomous vehicle or HAD may be configured to receive routing instructions from a mapping system 121 and automatically perform an action in furtherance of the instructions.

A HAD vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the position of the vehicle and routing instructions.

ADAS vehicles include one or more partially automated systems in which the vehicle alerts the driver. The features may be used to provide alerts to the operator regarding upcoming features. ADAS vehicles may include adaptive cruise control, automated braking, or steering adjustments to keep the driver in the correct lane. ADAS vehicles may issue warnings for the driver based on the position of the vehicle either on a roadway or within a road network system.

The mapping system 121 may include multiple servers 125, workstations, databases, and other machines connected together and maintained by a map developer. The mapping system 121 may be configured to receive probe reports from the device 122 that include data relating to a lane maneuver. The mapping system 121 may also be configured to generate routes or paths between two points (nodes) on a stored map. The mapping system 121 may be configured to provide up to date information and maps to external geographic databases 123 or mapping applications. The mapping system 121 may be configured to encode or decode map or geographic data.

The mapping system 121 may include one or more server(s) 125. A server 125 may be a host for a website or web service such as a mapping service and/or a navigation service. The mapping service may provide maps generated from the geographic data of the database 123, and the navigation service may generate routing or other directions from the geographic data of the database 123. The mapping service may also provide information generated from attribute data included in the database 123. The server 125 may also provide historical, future, recent or current traffic conditions for the road segments, segments, paths, or routes using historical, recent, or real time collected data.

Figure 5:
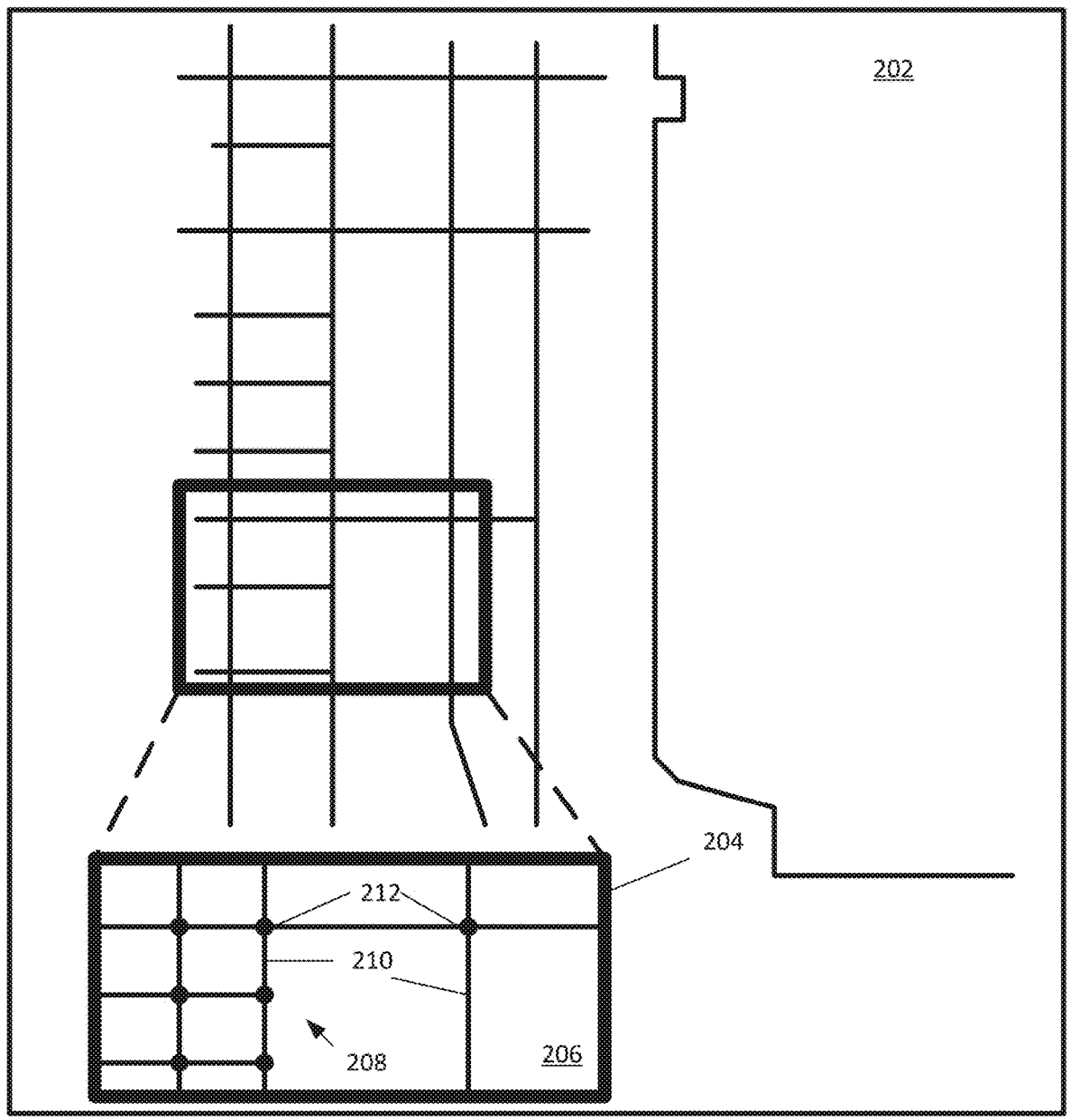
FIG. 5 illustrates a map of a geographic region.

The mapping system 121 includes the geographic database 123. In order to provide navigation related features and functions to the end user, the mapping system 121 accesses the geographic database 123. The geographic database 123 includes information about one or more geographic regions. FIG. 5 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 5 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Road segments 210 may also be referred to as links. Each road segment 210 is shown to have associated with it two nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 6:
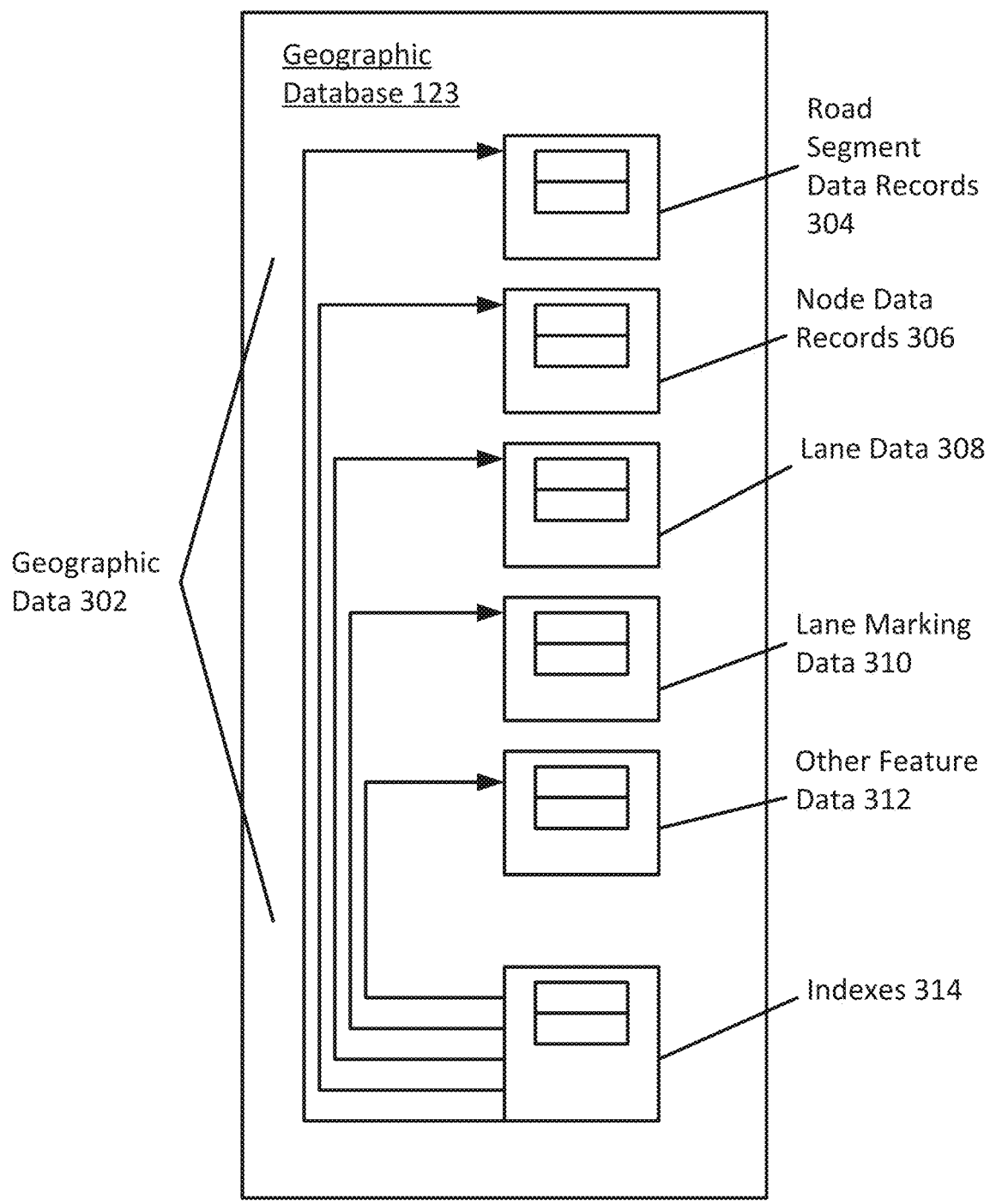
FIG. 6 illustrates a block diagram of a geographic database of FIG. 1.

As depicted in FIG. 6, in one embodiment, the geographic database 123 contains geographic data 302 that represents some of the geographic features in the geographic region 202 depicted in FIG. 5. The data 302 contained in the geographic database 123 may include data that represent the road network 208. In FIG. 6, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include feature data 308-312. The feature data 312 may represent types of geographic features. For example, the feature data may include lane data 308. The lane data 308 may be further stored in sub-indices that account for different environmental factors or vehicles types. The feature data may include, for example, lane marking records 310 that indicate lane marking on the roadway or signage data. The other kinds of feature data 312 may include point of interest data or other roadway features. The point of interest data may include point of interest records comprising a type (e.g., the type of point of interest, such as restaurant, fuel station, hotel, city hall, police station, historical marker, ATM, golf course, truck stop, vehicle chain-up stations etc.), location of the point of interest, a phone number, hours of operation, etc. The feature data may also include painted signs on the road, traffic signal, physical and painted features like dividers, lane divider markings, road edges, center of intersection, stop bars, overpasses, overhead bridges etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304. As another example, the indexes 314 may relate feature data such as lane maneuver delay data 308 with a road segment in the segment data records 304 or a strand of road segments.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout the geographic region to observe features and/or record information about the roadway. Actual observed feature data may be referred to as ground truth data. Remote sensing, such as aerial or satellite photography, may be used. The database 123 is connected to the server 125. The geographic database 123 and the data stored within the geographic database 123 may be licensed or delivered on-demand. Other navigational services or traffic server providers may access the traffic data and the feature data stored in the geographic database 123. Data including feature data may be broadcast as a service.

Each device 122 may store a copy of the geographic database 123. The mapping system may provide updates to the devices 122 using the network. The updates may be propagated though the devices 122 directly or through the use of ad hoc wireless networks such as a VANET. In the VANET, one device 122 in a cluster, for example, a cluster head, may communicate with roadside devices. The information from the roadside devices, for example map updates, may be propagated by the cluster head to other vehicles in the cluster. The cluster head may also transmit data collected from vehicles in the cluster to the roadside devices or other devices 122 on the roadway. In this way, the devices 122 and mapping system may always be connected. The connections provide up to date information about the roadways so that vehicles may perform safely and efficiently.

Figure 7:
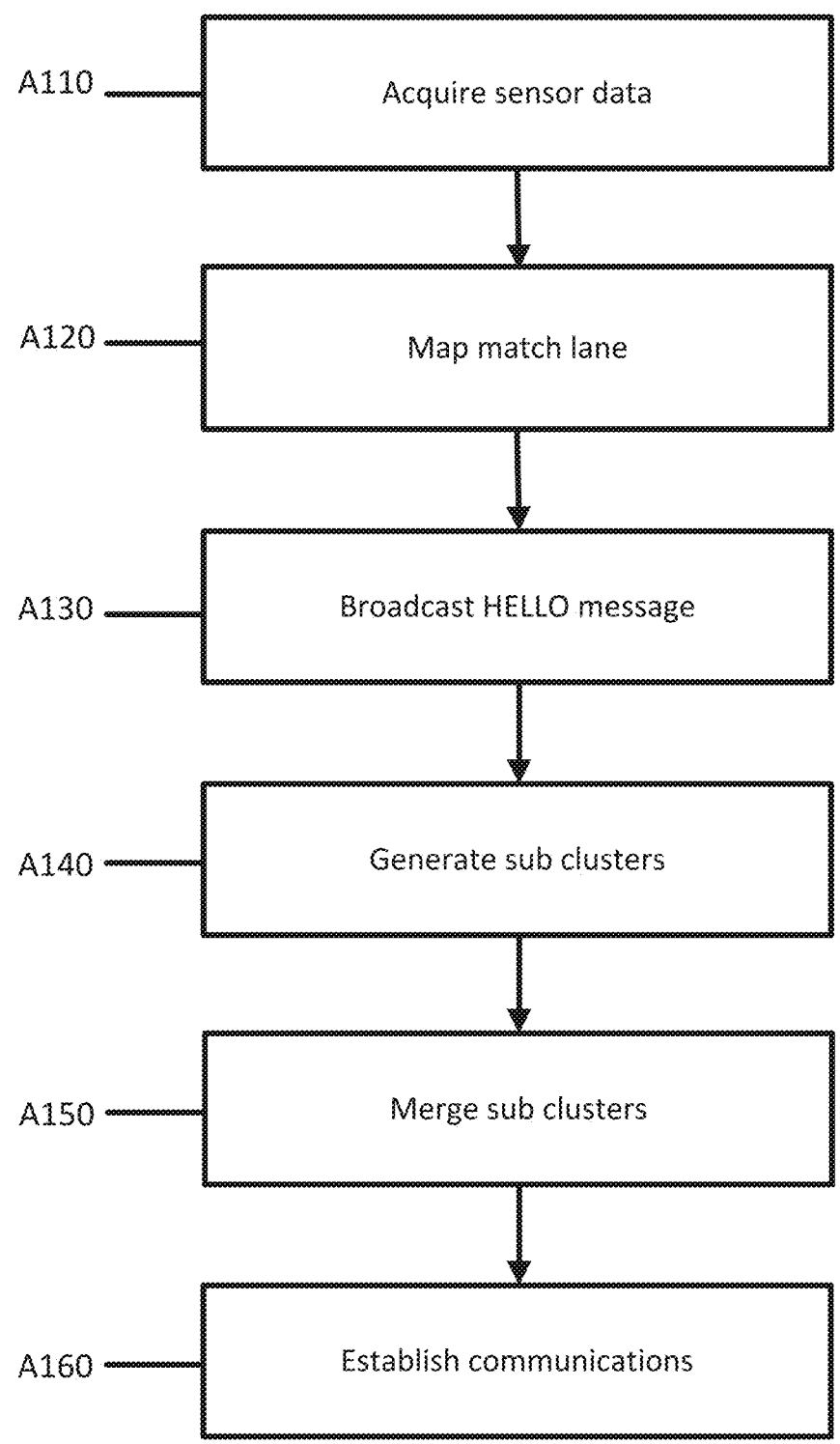
FIG. 7 depicts an example flowchart for generating lane aware VANET clusters for V2V communication according to an embodiment.

FIG. 7 illustrates an example flow chart for providing lane aware VANET clusters for V2V communications. The flow chart depicts a method that captures the intrinsic dynamics of moving vehicles on a road with a goal of providing for data for navigation applications, real-time traffic, and intelligent transportation systems. One of the key technologies for capturing this dynamic is V2V communications that enable low latency inter-vehicle communication using VANETs. As presented in the following sections, the acts may be performed using any combination of the components indicated in FIG. 3, 4, or 10. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A110, sensor data is acquired from one or more sensors embedded in a vehicle. The sensor data includes a location, average speed, direction, and momentum of the vehicle among other data. Sensors may include sensors such as cameras, thermometer, cameras, radar sensors, sonar, LiDAR, and positional circuity such as GPS or accelerometers.

Temperature may be determined using a thermometer. Video data may be collected using a camera such as a rear facing or front facing camera. Video or imaging systems may use advanced features like surround-camera systems and night vision. Radar sensors at the front, rear and sides of the vehicle may be used. Though most frequently used as part of features like parking assistance and blind-spot detection, the sensors have the capability to detect objects at much greater range—for example, up to several hundred feet.

Radar sensors are excellent at detecting objects, but radar sensors are also excellent for backing up other sensors. For example, a front-facing camera might not be able to see through heavy weather. Radar sensors, however, may easily penetrate fog and snow, and may alert a driver about conditions obscured by poor conditions. Like radar, sonar (or ultrasonic sensors) may detect objects in the vicinity around the car. Ultrasonic sensors are more inexpensive than radar sensors, but have a limited effective range of detection. As Radar is to radio waves, and Sonar is to sound, LiDAR uses lasers to determine distance to objects. LiDAR spins a laser across its field of view and measures the individual distances to each point that the laser detects. LiDAR may create an extremely accurate (within 2 centimeters) 3D scan of the world around the car. GPS and other positioning systems may be used for determining a location of the vehicle. Each of the sensors may provide data to the device 122. The device 122 may analyze the data to generate information relating to the vehicle. The device 122 may also acquire data from, for example, the vehicle itself, such as direction, velocity, and acceleration.

At Act A120, the location of the vehicle is map matched to a lane using the sensor data. A GPS value may be used to identify the road segment using a map matching algorithm to match the GPS coordinates to a stored map and road segment. Lane level map matching may provide a good estimate of what lane a vehicle is on given a sequence of GPS probes coming from the vehicle. Other sensor data may be used to identify the lane and road segment that the vehicle is on. Another technique may use lateral acceleration sensors. Lane changes may be detected by determining a threshold of acceleration×time, above which a lane change would have occurred. The method may only detect that the change was of sufficient magnitude and direction to have a displacement greater than the lane width. Gyro compasses, gyro-like compasses or magnetometers of sufficient sensitivity may also be used to indicate if the vehicle is or is not turning onto another road. For example, a value would be less than a 45-degree total change without a road curvature. Another method may use lateral acceleration method indicating initiation of a lane change, followed by lateral deceleration without a large change in direction to indicate completion of the lateral displacement. A determination of intent or completion of a lane change may be determined using individual techniques or a combination of multiple techniques. The probe report may include data from multiple sensors from which intent or completion may be derived. For lane level map matching, using historical raw GPS probe positions, a layer of abstraction may be created over a map which is used to generate lane probabilities of real-time probes based on their lateral position. The probabilities form emissions probabilities of a hidden Markov model in which a Viterbi algorithm is used to make an inference of the actual most probable lane a probe trajectory traversed.

At Act A130, the sensor data and lane are exchanged with other vehicles within a proximity radius. When attempting to join a cluster, a device 122 broadcasts a HELLO message to all vehicles within a certain proximity. The HELLO message may be sent to all other devices 122 within a predefined proximity, e.g., broadcast by the vehicle and received by any devices 122 that are listening. The predefined proximity may be based on physical distance, for example, the transmission distance of the device 122. The HELLO message may include attributes of the originating vehicle. For example, a device 122 may generate and transmit a HELLO message that includes a GPS location, current speed, acceleration, direction, lane position, and other information related to the device 122. After receiving respective HELLO messages back from nearby vehicles, the vehicle will be capable of processing all other vehicles' information, which includes an ID number, GPS location, current speed, acceleration, direction, lane position, and other information related to the device 122. Every vehicle upon receiving the HELLO message from others stores the other vehicle's information and subsequently uses this information to determine a proximity of each vehicle and save it for further usage. During the information collection process, the receiving vehicle stores the information and forwards the information to the next vehicle. After a number of transmissions, vehicles will have all the neighbors' information.

At Act A140, sub clusters of the other vehicles are generated as a function of the lane location. A VANET sub cluster is created of vehicles driving on the same lane based on proximity vehicle distance. The proximity vehicle distance may be set based on the speed, lane type, transmission range, or other variable. The proximity vehicle distance may be calculated from a cluster head vehicle or may be, for example, based on the distance or variance between two of the furthest separated vehicles in the sub cluster. Each VANET sub cluster may be controlled by a cluster head. The cluster head is responsible for passing packets and organizing inter-/intra-cluster information traffic. Most of the clustering routing protocols normally elect the cluster head based on the location or velocity. A selection using location is not usually an optimum choice, because the location of the selected vehicle may rapidly change according to the relative speed with the other vehicles in the network. The vehicle with the best location may quickly become unsuitable as the cluster head. On the other hand, selecting the cluster head according to the velocity is also not appropriate in many situations, for example, when the relative movement between vehicles is very high. This will consequently lead to cluster instability. Moreover, the speed of the vehicles directly affects their locations. The cluster head selection method may include many factors to obtain high cluster stability and network reliability. The cluster head may be selected by considering the location, velocity, and the equipment of the vehicles in order to obtain a high cluster stability and for optimum utilization of available equipment in the network.

Figure 8:
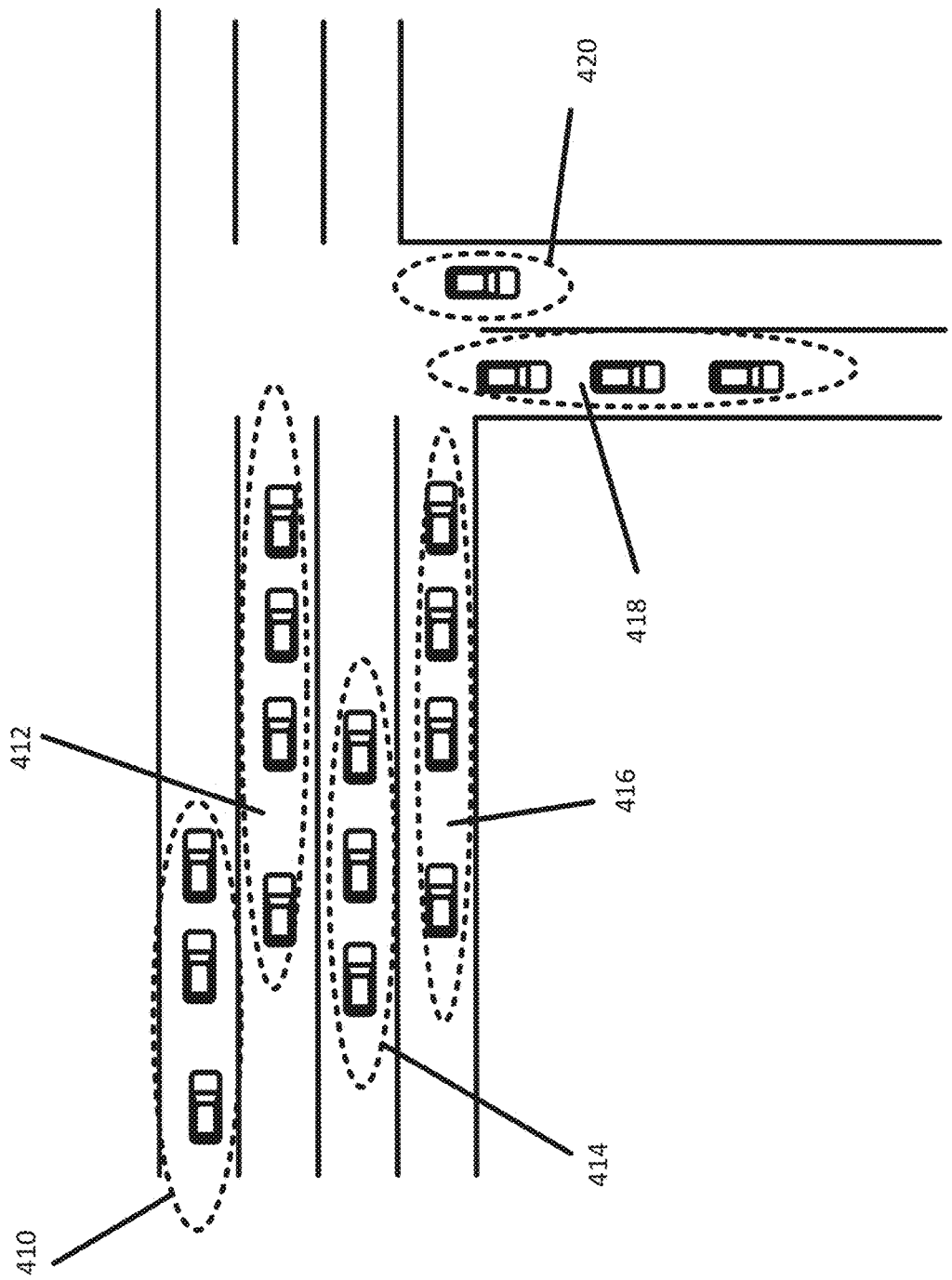
FIG. 8 depicts an example of sub clusters according to an embodiment.

FIG. 8 depicts an example of sub clusters. In FIG. 8, a four-lane road intersects with a two-lane road. As depicted, there are six separate sub clusters 410, 412, 414, 416, 418, 420 formed. Each sub cluster 410, 412, 414, 416, 418, 420 includes vehicles that share a lane and are in proximity to each other. The number of vehicles in each sub cluster may vary due to the distance between vehicles. Sub clusters 416 and 412 each include four vehicles while sub cluster 420 only includes one vehicle.

At Act A150, the sub clusters are merged into a cluster of vehicles as a function of the sensor data. A cluster head may identify attributes of the sub cluster. For example, the cluster head may determine an average speed of vehicles in the sub cluster or momentum or direction of the vehicles. Other attributes collected from the vehicles may also be used to identify attributes of the cluster as a whole. The cluster head communicates the attributes to other nearby cluster heads to merge the sub clusters to form one VANET cluster based on similarity in sub clusters in terms of spatial proximity, similarity in average speed/velocity or momentum, and similarity in direction. Average speed/velocity may be calculated by identifying the speed/velocity of each of the vehicles in the sub cluster and taking the average or other calculated value. Similar average speeds/velocity may, for example, be within 5%, 10%, or 25% of one another or within 1 kmph, 2 kmph, 5 kmph. Similarity of speed or velocity may be dependent on the type of roadway or vehicle. Similarity of spatial proximity may be also be calculated by identify a position or relative position of each of the vehicles and determining an average position or positions between each sub cluster. Similar proximity may include vehicles within a short-range transmission range (e.g., within acceptable error levels). Similarity of direction may refer to vehicles that are traveling in the same direction on a roadway. Since many roadways are formed at larger angles, the differences may be readily apparent if one sub cluster is heading in the same direction as another sub cluster. Each of the attributes may provide an increase or decrease in the chance that a cluster will be maintained. For example, if the average speed of two sub clusters is similar, then the two clusters will most likely maintain a tight formation as the vehicles traverse the roadway. Similarly, the two clusters if maintaining a similar speed and are close in spatial proximity will experience the same roadway conditions. For example, an obstacle identified by one vehicle may require maneuvers by vehicles in both sub clusters indicating that merging the sub clusters may provide additional safety.

Figure 9:
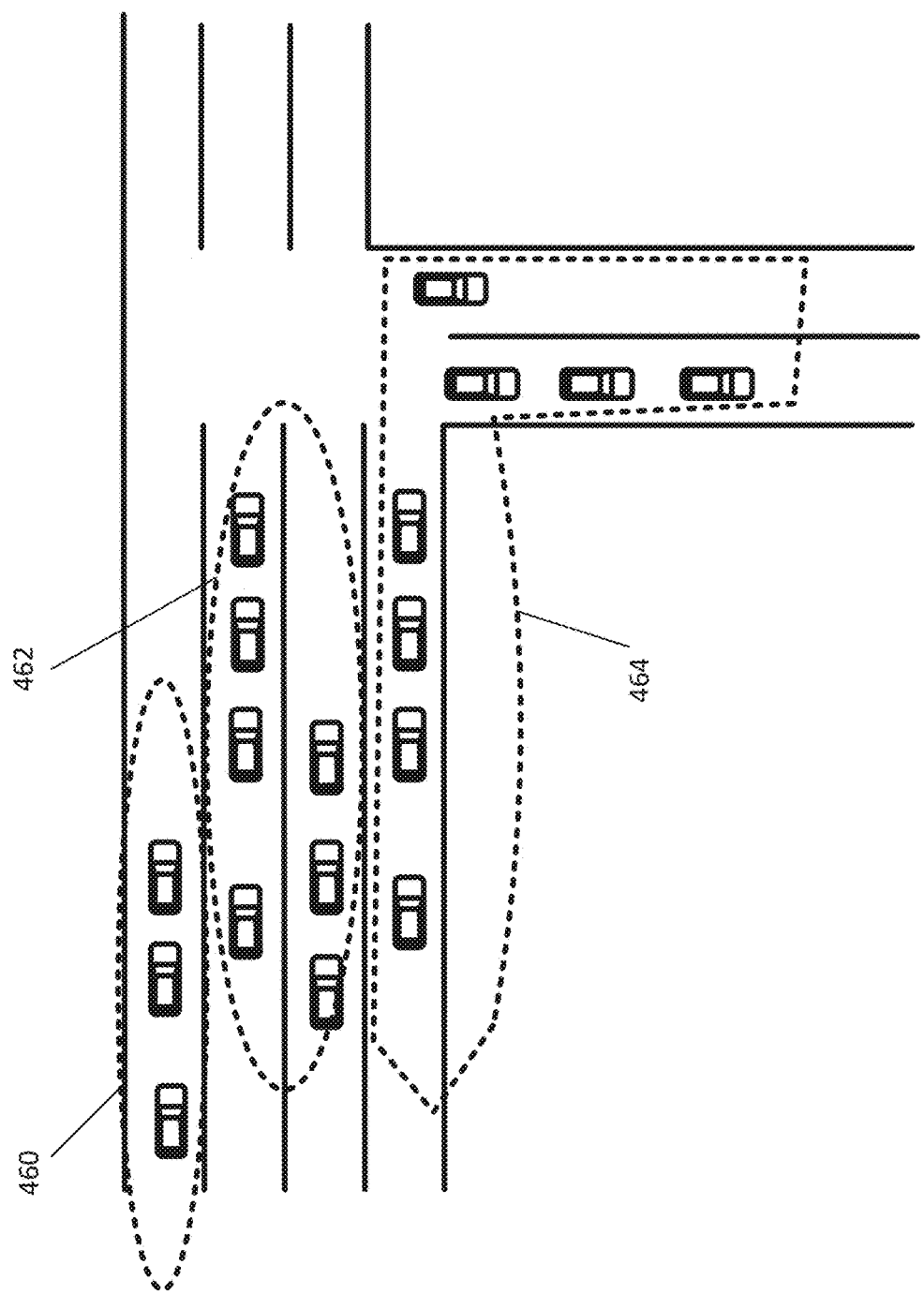
FIG. 9 depicts an example of merged sub clusters according to an embodiment.

In an embodiment, the similarities in the lanes may be used to merge the sub clusters. As an example, and depicted below in FIG. 9, even though a lane may not share a similar direction as another lane, the clusters may be merged because the cluster may be expected to stick together given the lane parameters. In FIG. 9 described below, two sub clusters are combined because one lane is a right turn only lane that feeds into the second lane.

FIG. 9 depicts an example of a cluster generated from merged sub clusters. In FIG. 9, the six sub clusters 410, 412, 414, 416, 418, 420 from FIG. 8 have been merged into three clusters 460, 462, 464. The merging may be based on the similarity of the speed, direction, momentum, proximity, etc. of the sub clusters 410, 412, 414, 416, 418, 420. For example, in FIG. 9, the sub clusters 412 and 414 have been merged as the direction, speed, and proximity are very similar. However, the sub cluster 410 was not merged into cluster 462 as, for example, the speed of the vehicles in 410 may differ from that of the vehicles in 412 and 414. The sub clusters 416, 418, and 420 have also been merged. The vehicles in sub cluster 416 are in a right turn only lane indicating that the vehicles will follow the vehicles in sub cluster 418. So even though the direction is different, the sub clusters may be merged. The speed of the vehicles in 416, 418, and 420 may also be similar. The proximity and speed of the vehicle in 420 is similar to that of those in 418 and thus should be merged. After merging, a cluster head may be selected for the merged VANET cluster. The cluster head may have been a cluster head of a sub cluster or may be newly elected or selected by the participants in the cluster.

At Act A160, V2V communication is established between vehicles in the cluster of vehicles. The new cluster and the sub clusters may be reformed, may admit or reject new devices 122 to the cluster, or perform new cluster head elections as needed as vehicles drop out of range or alter their parameters. The sub clusters may change more rapidly than the cluster due to lane changes. The new cluster head establishes communication between various cluster head on a road segment. This communication may either be via V2V or V2I2V or V2C. The new cluster head may communicate with other cluster heads, roadside beacons, or other devices 122.

The communications between the members of the VANET cluster may include messages that describe the roadway conditions or observations of the vehicles. One example use is when one vehicle observes an object that is not on the HD map, for example a pothole in the road. The vehicle may identify the pothole from sensor data and transmit the location to vehicles in the cluster. The vehicle in the cluster may update their local HD map to include the pothole and take any actions that might be required. In addition, the information about the pothole may be passed to the cluster head that is in communication with other cluster heads and a roadside transmitter. The cluster head informs the other cluster heads and the roadside transmitter which passes the information along. In this way, the vehicles on the roadway may quickly share information between vehicles that need the information right away but also share information with the general system for recordation and future use.

Figure 10:
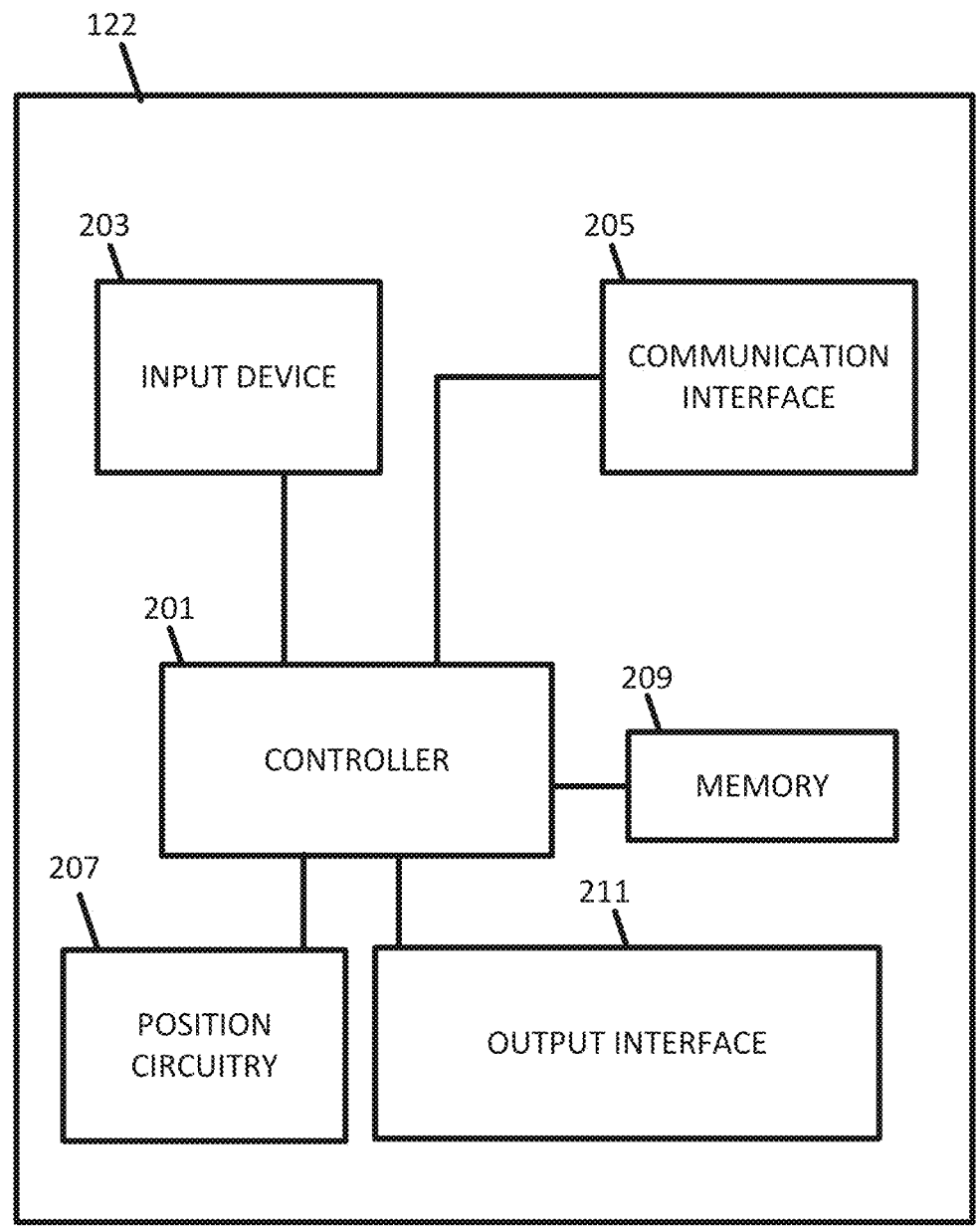
FIG. 10 depicts an example device of FIG. 4.

FIG. 10 illustrates an example device 122 of the system of FIG. 4 that may be configured to receive and execute lane level routing commands. The device 122 may be configured to collect, transmit, receive, process, or display data. The device 122 may also be referred to as a probe 122, a mobile device 122 or a navigation device 122. The device 122 includes a controller 201, a memory 209, an input device 203, a communication interface 205, position circuitry 207, and an output interface 211. Additional, different, or fewer components are possible for the mobile device 122. The device 122 may be smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a device 122, or the device 122 may be integrated into a vehicle. The device 122 may receive or collect data from one or more sensors in or on the vehicle.

The device 122 is configured for using GPS only for lane-localization of vehicles in VANETs powered by lane level map matching. The device 122 is configured to use lane localized VANET clustering (e.g., VANET cluster of vehicles on the same lane). The device 122 may be configured to use lane aware VANET clustering to detect phantom traffic or sudden slow-downs at lane-level. The device 122 is configured to use two dimensional VANET clusters protocol or grid-based VANET clusters where one dimension represents cross-sectional cluster of vehicles across the lanes, while the other dimension represents lateral cluster along the lanes. Having a cluster head for each dimension will allow for a more robust VANET. The two-dimensional cluster provide longer lasting and consistent VANET clusters which enable navigation services and applications for the device 122.

The controller 201 may store the route or instructions in a memory 209. The memory 209 may be a volatile memory or a non-volatile memory. The memory 209 may include one or more of a read only memory (ROM), random access memory (RAM), a flash memory, an electronic erasable program read only memory (EEPROM), or other type of memory. The memory 209 may be removable from the mobile device 122, such as a secure digital (SD) memory card. The memory may contain a locally stored geographic database 123 or link node routing graph. The locally stored geographic database 123 may be a copy of the geographic database 123 or may include a smaller piece. The locally stored geographic database 123 may use the same formatting and scheme as the geographic database 123.

The controller 201 may include a general processor, digital signal processor, an application specific integrated circuit (ASIC), field programmable gate array (FPGA), analog circuit, digital circuit, combinations thereof, or other now known or later developed processor. The controller 201 may be a single device or combinations of devices, such as associated with a network, distributed processing, or cloud computing. The controller 201 may receive updated instructions, traffic data, or other data as the vehicle traverses the route. The controller 201 may be configured to perform a sequential cluster forming algorithm for a VANETs. The controller 201 collects information from sensors in the vehicle. The controller 201 uses cloud based or embedded lane level map matching (LLMM) algorithm to map-match the vehicles GPS to lane or "if available" obtain current driving lane via other vehicle sensors like vision, etc. The controller 201 uses ad-hoc wireless communication to exchange data amongst vehicles within a proximity radius and exchange information such as: GPS location, Current Speed, Lane, Direction, etc. VANET sub clusters of vehicles driving on the same lane are created based on proximity vehicle distance. The clusters are merged to form one VANET cluster based on similarity in sub clusters in terms of spatial proximity, similarity in average speed or momentum and similarity in direction. An VANET cluster algorithm is run to select the cluster heads for the emerged clusters. Communication is established between various cluster heads on a road segment. This communication may either be via V2V or V2I2V or V2C. The communication may be performed using a communications interface 205.

The communications interface 205 may include any operable connection. An operable connection may be one in which signals, physical communications, and/or logical communications may be sent and/or received. An operable connection may include a physical interface, an electrical interface, and/or a data interface. The communications interface 205 provides for wireless and/or wired communications in any now known or later developed format. The communications interface 205 may include a receiver/transmitter for digital radio signals or broadcast mediums.

The communications may include information related to a roadway condition or other navigation service. The information may be displayed to a user or occupant of the vehicle using an output interface 211. The output interface 211 may be a liquid crystal display (LCD) panel, light emitting diode (LED) screen, thin film transistor screen, or another type of display. The output interface 211 may also include audio capabilities, or speakers.

The communications may include information such as route guidance or traffic conditions. The communications may include an instruction for an action to be taken by the vehicle. In an embodiment, the controller 201 performs the instructions automatically. The device 122 may be integrated into an autonomous vehicle or a highly-assisted or highly-automated driving (HAD) vehicle. The device 122 may be configured as a navigation system for an autonomous vehicle or a HAD. An autonomous vehicle or HAD may take route instruction based on the road segment and node information provided to the navigation device 122. An autonomous vehicle or HAD may be configured to receive instructions from a mapping system 121 or the controller 201 and automatically perform an action.

The device 122 may be integrated in the vehicle, which may include assisted driving vehicles such as autonomous vehicles, highly assisted driving (HAD), and advanced driving assistance systems (ADAS). Any of these assisted driving systems may be incorporated into device 122. Alternatively, an assisted driving device may be included in the vehicle. The assisted driving device may include memory, a processor, and systems to communicate with the device 122. The assisted driving vehicles may response to geographic data received from geographic database 123 and the server 125, which may have been updated.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. An intelligent transportation system comprising:
a vehicular ad hoc network configured to provide communications between a cluster head and devices in a first plurality of vehicles and a second plurality of vehicles; wherein the vehicular ad hoc network is formed by generation of a first sub cluster of the first plurality of vehicles driving in a first lane a generation of a second sub cluster of the second plurality of vehicles driving in a second lane, and a combination of the first sub cluster and second sub cluster based on a spatial proximity, an average velocity, and a momentum of the first sub cluster and second sub cluster; and
at least one roadside communication unit configured to communicate with the cluster head.

2. The intelligent transportation system of claim 1, wherein the at least one roadside communication unit is configured to communicate traffic conditions to the cluster head.

3. The intelligent transportation system of claim 2, further comprising:
a mapping server configured to communicate the traffic conditions to the at least one roadside communication unit.

4. The intelligent transportation system of claim 1, wherein the average velocity of the first sub cluster and second sub cluster are within 10% of each other.

5. The intelligent transportation system of claim 1, wherein the vehicular ad hoc network is further configured to provide communications between the cluster head and at least one other cluster head of a different cluster of vehicles.

6. The intelligent transportation system of claim 1, wherein the vehicular ad hoc network does not rely on a pre-existing infrastructure.

7. The intelligent transportation system of claim 1, wherein the at least one roadside communication unit comprises a device configured to send and receive messages from nearby vehicles using short range communications.

8. A method for forming clusters for vehicle to vehicle communication, the method comprising:

generating, by a vehicular ad hoc network, a sub cluster of vehicles operating on a same lane;

merging, by the vehicular ad hoc network, the sub cluster with other sub clusters of vehicles into a cluster of vehicles based on a spatial proximity, an average speed, and a momentum of the sub clusters;

providing, by the vehicular ad hoc network, communications between a cluster head and vehicles in the cluster of vehicles; and providing, by the vehicular ad hoc network, communications between the cluster head and at least one roadside communication unit.

9. The method of claim 8, wherein generating a sub cluster comprises:

identifying, by the vehicular ad hoc network, vehicles driving on the same lane within a proximity vehicle distance related to a transmission range; and selecting, by the vehicular ad hoc network, the cluster head for the sub cluster as a function of a cluster head selection algorithm.

10. The method of claim 8, further comprising:

establishing, by the vehicular ad hoc network, communication between the cluster head and at least one other cluster head of a different cluster of vehicles.

11. The method of claim 8, further comprising:

sharing, by the vehicular ad hoc network, information relating to a roadway condition between the vehicles in the cluster of vehicles.

12. The method of claim 8, wherein the communications between the cluster head and at least one roadside communication unit comprise transmission of traffic conditions.

13. The method of claim 8, wherein the vehicular ad hoc network does not rely on a pre-existing infrastructure.

14. An apparatus for forming clusters for vehicle to vehicle communication, the apparatus comprising:

one or more sensors configured to acquire data for a vehicle of a first plurality of vehicles;

a transceiver configured to transmit and receive data to and from other vehicles on a roadway; and a vehicular ad hoc network configured to provide communications between a cluster head and devices in the first plurality of vehicles operating on a first lane and a second plurality of vehicles operating on a second lane; wherein the vehicular ad hoc network is formed by generation of a first sub cluster of the first plurality of vehicles, generation of a second sub cluster of the second plurality of vehicles, and a combination of the first sub cluster and second sub cluster based on a spatial proximity of the vehicles of the first sub cluster and the second sub cluster.

15. The apparatus of claim 14, wherein the one or more sensors are configured to acquire sensor data about the roadway, wherein the transceiver is configured to transmit the sensor data about the roadway to the other vehicles in the vehicular ad hoc network.

16. The apparatus of claim 14, wherein the spatial proximity is calculated as a function of an average velocity of the vehicles.

17. The apparatus of claim 14, wherein the vehicle is elected as the cluster head and is configured to communicate with other cluster heads of other clusters.

18. The apparatus of claim 14, further comprising:

one or more roadside communication units configured to send and receive messages from to the cluster head using short range communications.

19. The apparatus of claim 14, wherein the vehicular ad hoc network does not rely on a pre-existing infrastructure.

* * * * *